(12) United States Patent
Fang et al.

(10) Patent No.: US 11,954,278 B2
(45) Date of Patent: Apr. 9, 2024

(54) DISPLAY PANEL AND ELECTRONIC DEVICE

(71) Applicant: WUHAN CHINA STAR OPTOELECTRONICS SEMICONDUCTOR DISPLAY TECHNOLOGY CO., LTD., Wuhan (CN)

(72) Inventors: Liang Fang, Wuhan (CN); Ding Ding, Wuhan (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/620,720

(22) PCT Filed: Nov. 26, 2021

(86) PCT No.: PCT/CN2021/133495
§ 371 (c)(1),
(2) Date: Dec. 19, 2021

(87) PCT Pub. No.: WO2023/087367
PCT Pub. Date: May 25, 2023

(65) Prior Publication Data
US 2024/0028147 A1 Jan. 25, 2024

(30) Foreign Application Priority Data

Nov. 16, 2021 (CN) .......................... 202111353329.2

(51) Int. Cl.
*G06F 3/041* (2006.01)
*G09G 3/00* (2006.01)

(52) U.S. Cl.
CPC ........... *G06F 3/0412* (2013.01); *G09G 3/006* (2013.01)

(58) Field of Classification Search
CPC .............................. G06F 3/0412; G09G 3/006
See application file for complete search history.

(56) References Cited

U.S. PATENT DOCUMENTS 11,144,198 B2 * 10/2021 Chen .................... G06F 3/04886
11,737,340 B2 * 8/2023 Li .......................... G06F 3/0443
345/156

(Continued)

FOREIGN PATENT DOCUMENTS

CN 104216564 A 12/2014
CN 104793803 A 7/2015
(Continued)

OTHER PUBLICATIONS

International Search Report in International application No. PCT/CN2021/133495, dated Jul. 27, 2022.
(Continued)

*Primary Examiner* — Vinh T Lam
(74) *Attorney, Agent, or Firm* — PV IP PC; Wei Te Chung; Zhigang Ma

(57) ABSTRACT

The present application provides a display panel and an electronic device. A functional region and a transition region of the display panel are located between two adjacent touch electrodes, each touch electrode is electrically connected to a first signal transmission line, first signal shielding lines are disposed between the first signal transmission lines of a same touch electrode group and the touch electrodes of an adjacent touch electrode group, and a part of the first signal shielding line is located in the transition region, so as to alleviate a problem of poor touch performance of an existing out-cut screen.

20 Claims, 7 Drawing Sheets

(56) References Cited

U.S. PATENT DOCUMENTS

| | | | |
|---|---|---|---|
| 11,803,269 B2* | 10/2023 | Wang | G06F 3/04164 |
| 11,829,540 B2* | 11/2023 | Su | G02F 1/136204 |
| 11,829,568 B2* | 11/2023 | Wu | G06F 3/0446 |
| 2019/0079622 A1* | 3/2019 | Choi | G06F 3/0443 |
| 2020/0272011 A1 | 8/2020 | Yoshida | |
| 2023/0023671 A1* | 1/2023 | Shim | G06F 3/0412 |
| 2023/0078619 A1* | 3/2023 | Chai | G06F 3/0412 |
| | | | 345/174 |
| 2023/0152927 A1* | 5/2023 | Peng | G06F 3/0446 |
| | | | 345/175 |

FOREIGN PATENT DOCUMENTS

| | | |
|---|---|---|
| CN | 206515805 U | 9/2017 |
| CN | 110244873 A | 9/2019 |
| CN | 110837314 A | 2/2020 |
| CN | 210534741 U | 5/2020 |
| CN | 112328112 A | 2/2021 |
| CN | 112506373 A | 3/2021 |
| CN | 213904304 U | 8/2021 |
| CN | 113589968 A | 11/2021 |

OTHER PUBLICATIONS

Written Opinion of the International Search Authority in International application No. PCT/CN2021/133495, dated Jul. 27, 2022.
Chinese Office Action issued in corresponding Chinese Patent Application No. 202111353329.2 dated Apr. 5, 2023, pp. 1-7.

* cited by examiner

DISPLAY PANEL AND ELECTRONIC DEVICE

BACKGROUND OF DISCLOSURE

Field of Disclosure

The present disclosure relates to a field of display technology, and in particular, to a display panel and an electronic device.

Description of Prior Art

Organic light-emitting diode (OLED) displays are increasingly popular in the market because of advantages such as active light emission, wide viewing angles, wide color gamut, high brightness, fast response speed, low power consumption, and flexible structure. At the same time, in order to achieve a high screen proportion, special-shaped display screens, such as a bang screen, a water droplet screen, and an out-cut (O-Cut) screen have appeared. In the O-Cut screen, a through hole is formed by cutting a display screen to place functional elements such as a camera. In order to realize touch function of the display screen and reduce a thickness of the display screen, an oncell touch scheme appeared. In the oncell touch scheme, a touch panel is disposed on an OLED panel, and the touch panel may adopt a self-capacitive structure, that is, the oncell touch scheme is a self-capacitance direct on-cell touch (S-DOT) scheme. The self-capacitance structure comprises a plurality of independent sub-touch electrodes. Each independent sub-touch electrode is independently led out through a touch wire, which can effectively improve performance, such as touch sensitivity. However, there is signal interference between the touch wire and adjacent sub-touch electrodes, which may cause poor touch performance.

Therefore, there exists a problem of poor touch performance in a conventional O-Cut screen to be solved.

SUMMARY OF DISCLOSURE

The present disclosure provides a display panel and an electronic device to alleviate a technical problem of poor touch performance of a conventional O-Cut screen.

In order to solve the above problems, the present disclosure provides the following technical solutions:

The present disclosure provides a display panel, comprising a functional region, a display region disposed close to the functional region, and a transition region located between the functional region and the display region, wherein the display panel further comprises:
  a display substrate;
  a touch layer disposed on the display substrate, wherein the touch layer comprises a plurality of touch electrode groups arranged at intervals in the display region in a first direction, each of the touch electrode groups comprises at least one touch electrode arranged in a second direction;
  a plurality of first signal transmission lines, wherein each of the first signal transmission lines is electrically connected to one of the touch electrodes;
    first signal shielding lines, wherein each of the first signal shielding lines is disposed corresponding to a gap between two adjacent touch electrode groups and located between the first signal transmission lines of a same touch electrode group and the touch electrodes of an adjacent touch electrode group;

wherein the functional region and the transition region are located between two adjacent touch electrode groups, and in the two touch electrode groups, a size of the touch electrodes close to the transition region is less than a size of other touch electrodes, one of the first signal shielding lines passes through the transition region, and in the transition region, a profile of the first signal shielding line matches a profile of a corresponding functional region.

In the display panel provided in the embodiment of the present disclosure, the display panel further comprises a crack detection circuit, in the transition region, the crack detection circuit surrounds the functional region, and the crack detection circuit is located on a side of the first signal shielding line close to the functional region.

In the display panel provided in the embodiment of the present disclosure, the crack detection circuit comprises a first crack detection line and a second crack detection line, and the first crack detection line and the second crack detection line are electrically connected or integrally disposed in the transition region such that the first crack detection line and the second crack detection line are enclosed to form a closed-loop crack detection circuit.

In the display panel provided in the embodiment of the present disclosure, the display panel further comprises at least one signal monitoring line disposed corresponding to a gap between two adjacent touch electrode groups.

In the display panel provided in the embodiment of the present disclosure, the functional region is located in a middle region of the display panel and the signal monitoring line is located between the first signal shielding line and the functional region in the transition region.

In the display panel provided in the embodiment of the present disclosure, the display panel further comprises a second signal shielding line, the second signal shielding line is located between two adjacent touch electrode groups, and electrically connected to the first signal shielding lines, and the second signal shielding line and the first signal shielding lines half surround the signal monitoring line.

In the display panel provided in the embodiment of the present disclosure, the display panel further comprises a floating line located in the transition region, the floating line and the first signal shielding line are located on opposite sides of the functional region.

In the display panel provided in the embodiment of the present disclosure, the display panel further comprises a second signal shielding line, the second signal shielding line is located between two adjacent touch electrode groups and electrically connected to the first signal shielding lines, the second signal shielding line and the first signal shielding lines half surround the signal monitoring line; and
  in the transition region, the first signal shielding line and the second signal shielding line are located on opposite sides of the functional region, and the second signal shielding line is located on a side of the floating line away from the functional region.

In the display panel provided in the embodiment of the present disclosure, the display panel further comprises a non-display region surrounding the display region, the non-display region comprises an upper frame region and a lower frame region opposite to each other, and left frame region and a right frame region connecting the upper and lower frame regions, and the first signal shielding lines extend from the display region to the upper frame region, wherein the first signal shielding lines close to the left frame region are connected together in the upper frame region and extend into the left frame region; and the first signal shielding lines close to the right frame region are connected together in the upper frame region and extend into the right frame region.

In the display panel provided in the embodiment of the present disclosure, the display panel further comprises at least one signal monitoring line disposed corresponding to a gap between two adjacent touch electrode groups; and the signal monitoring line also extends from the display region to the upper frame region and from the upper frame region to the left frame region or the right frame region, and in the non-display region, the signal monitoring line is located on a side of the first signal shielding lines away from the display region.

In the display panel provided in the embodiment of the present disclosure, the display panel further comprises a crack detection circuit, in the transition region, the crack detection circuit surrounds the functional region and t is located on a side of the first signal shielding line close to the functional region, and the crack detection circuit comprises a first crack detection line and a second crack detection line;

the first crack detection line extends from the transition region to the upper frame region and from the upper frame region to the left frame region, and in the non-display region, the first crack detection line is located on a side of the signal monitoring line away from the first signal shielding lines; the second crack detection line extends from the transition region to the upper frame region and from the upper frame region to the right frame region, and in the non-display region, the second crack detection line is located on a side of the signal monitoring line away from the first signal shielding lines.

In the display panel provided in the embodiment of the present disclosure, the lower frame region is defined with a bonding region, the bonding region is bonded with driving chips, the first signal transmission lines, the first signal shielding lines, the signal monitoring line, the first crack detection line, and the second crack detection line are electrically connected to the driving chips, and the first signal shielding lines, the signal monitoring lines, the first crack detection line, and the second crack detection line extend from the left frame region or the right frame region to the lower frame region and are electrically connected to corresponding drive chips.

In the display panel provided in the embodiment of the present disclosure, the display panel further comprises compensation electrodes disposed in the transition region and electrically connected to corresponding touch electrodes.

In the display panel provided in the embodiment of the present disclosure, driving signals on the first signal shielding lines are same as driving signals on corresponding first signal transmission lines.

15. An electronic device, comprising the display panel of any one of the above embodiments and a camera disposed corresponding to a functional region of the display panel.

The display panel and the electronic device provided by the present disclosure comprises the functional region, the display region disposed close to the functional region, and the transition region between the functional region and the display region, the display panel further comprises the display substrate and the touch layer disposed on the display substrate, the touch layer comprises the plurality of touch electrode groups disposed on one side of the display region at intervals in the first direction, each of the touch electrode groups comprises at least one touch electrode disposed in the second direction, the functional region and the transition region are disposed between two adjacent touch electrodes, each of the touch electrodes is electrically connected to one first signal transmission line, each first signal shielding line is disposed between the first signal transmission lines of a same touch electrode group and the touch electrodes of an adjacent touch electrode group, the first signal shielding line is disposed corresponding to the gap between two adjacent touch electrode groups, and a part of the first signal shielding line is located in the transition region, the first signal shielding line is capable of shielding signal interference of the touch electrodes to the first signal transmission lines, so that a problem of poor touch performance of an existing O-Cut screen can be solved.

DESCRIPTION OF DRAWINGS

In order to more clearly explain technical solutions in embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

DETAILED DESCRIPTION OF EMBODIMENTS

Figure 1:
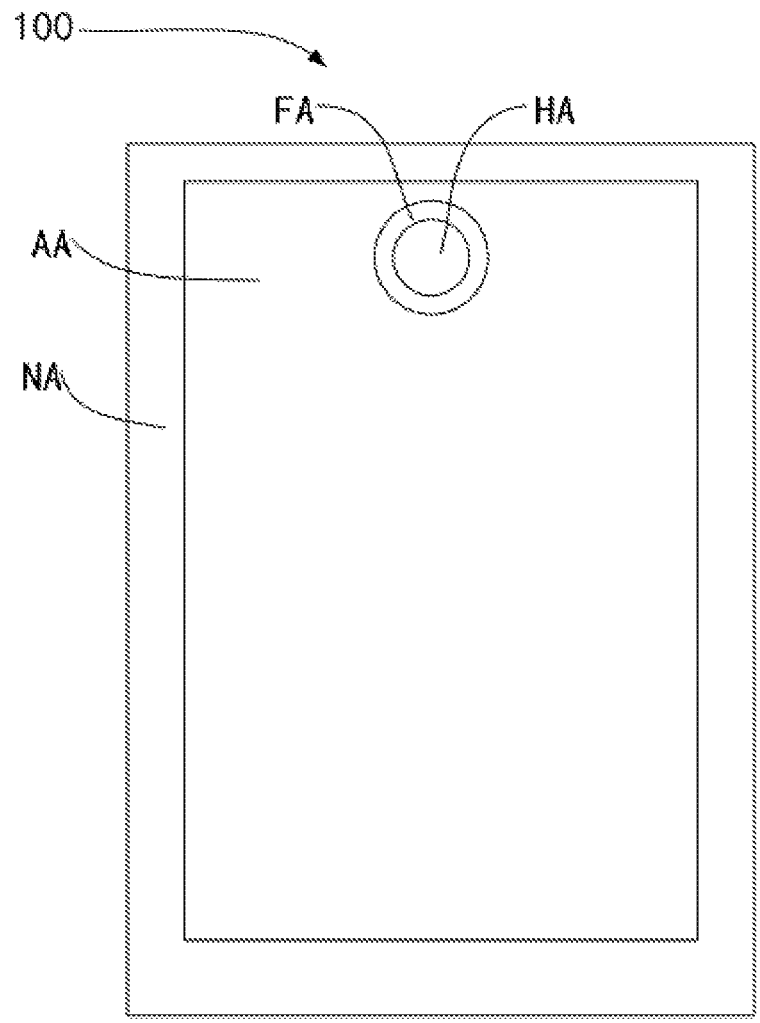
FIG. 1 is a schematic top view structural diagram of a display panel according to an embodiment of the present disclosure.

The description of the following embodiments refers to the attached drawings to illustrate specific embodiments in which the present disclosure can be implemented. Directional terms mentioned in the present disclosure, such as [up], [down], [front], [back], [left], [right], [inner], [outer], [side], etc., are only directions of the attached drawings. Therefore, the directional terms used are used to describe and understand the present disclosure, rather than to limit the present disclosure. In the drawings, units with similar structures are indicated by same reference numerals. In the drawings, thicknesses of some layers and regions are exaggerated for clarity of understanding and ease of description. That is, sizes and thickness of each component shown in the drawings are arbitrarily shown, and the present disclosure is not limited thereto.

Figure 2:
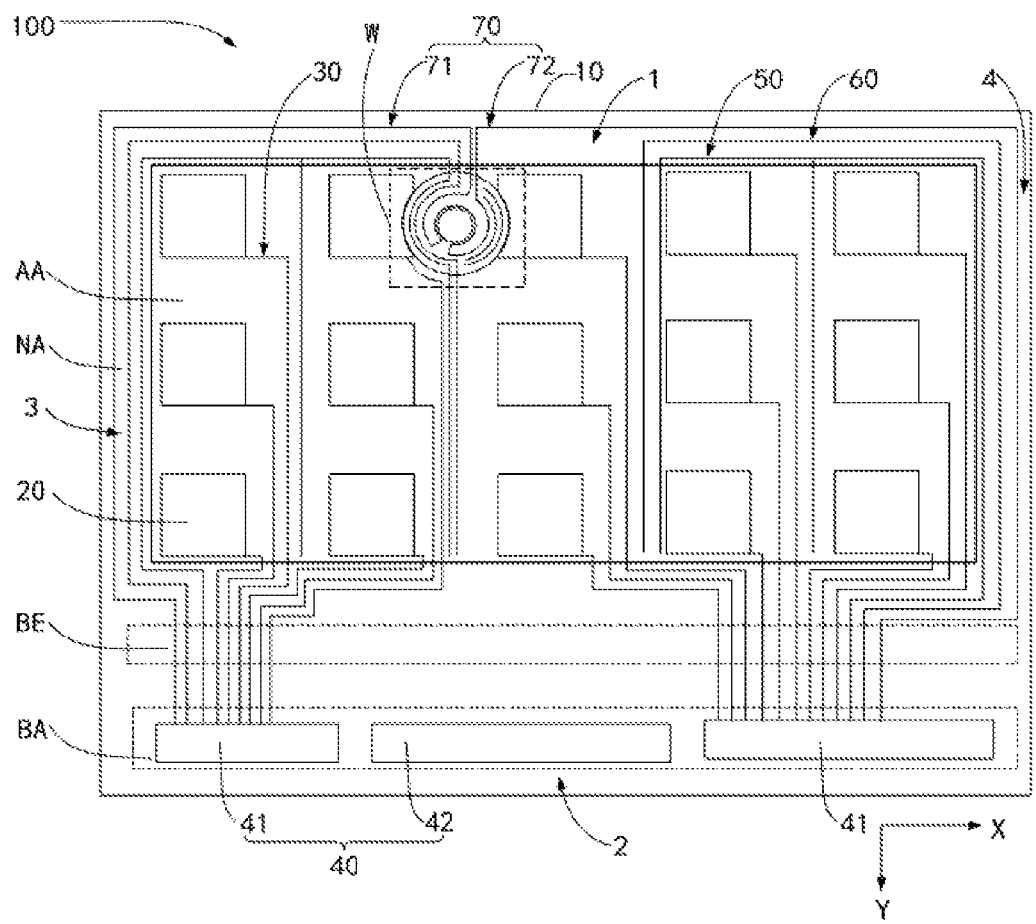
FIG. 2 is another schematic top view structural diagram of a display panel according to an embodiment of the present disclosure.
Figure 3:
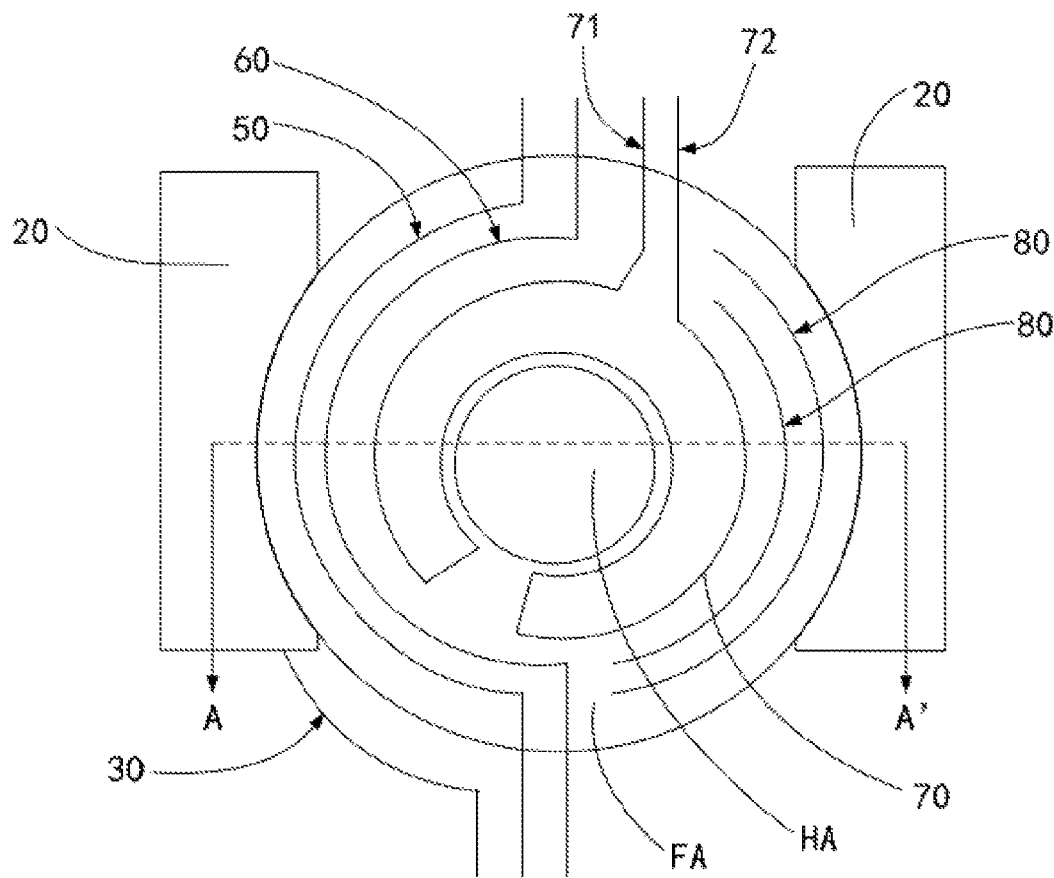
FIG. 3 is an enlarged detail diagram of a region W in FIG. 2.
Figure 4:
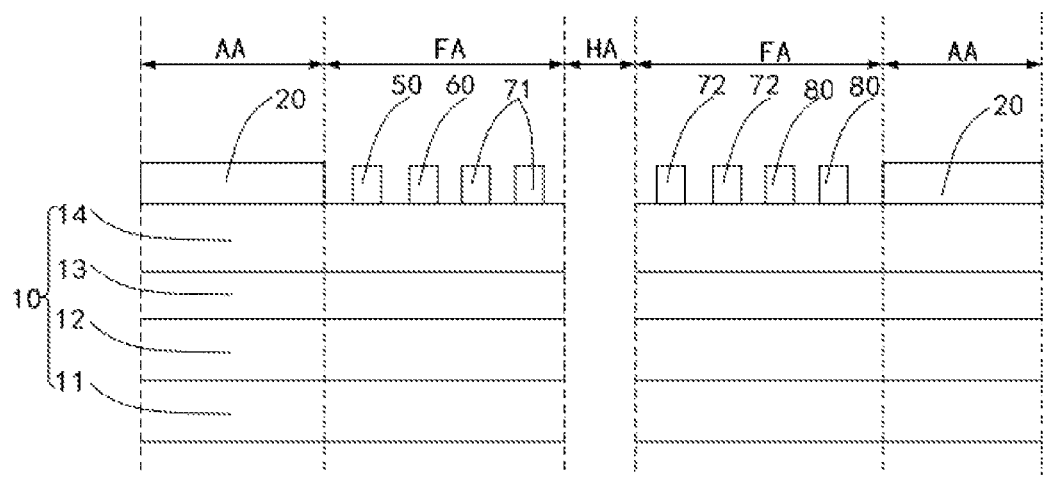
FIG. 4 is a schematic cross-sectional structural diagram taken along A-A' in FIG. 3.
Figure 5:
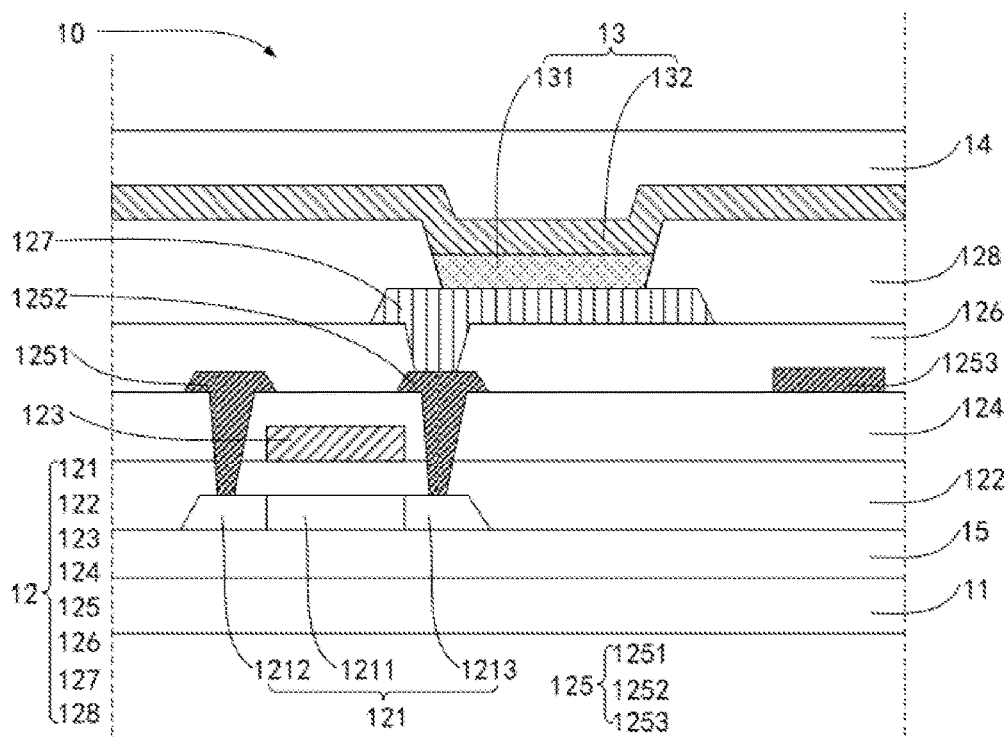
FIG. 5 is a detailed structural diagram of a display substrate shown in FIG. 4.
Figure 6:
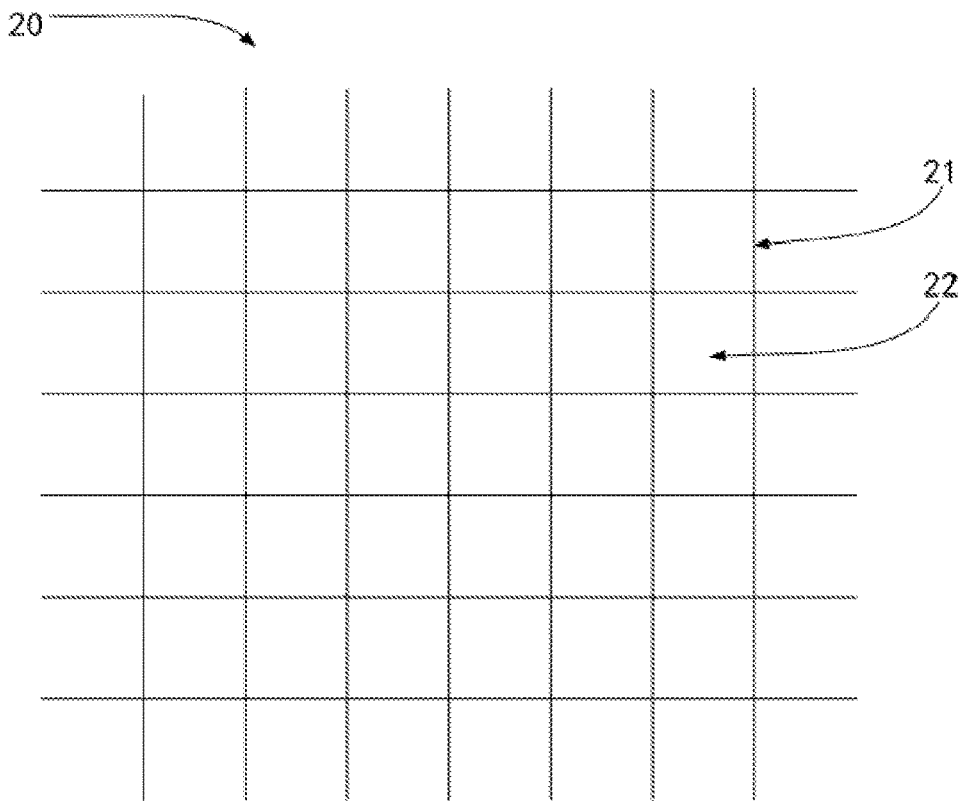
FIG. 6 is a detailed structural diagram of a touch electrode according to an embodiment of the present disclosure.

Referring to FIGS. 1 to 6, FIG. 1 is a schematic top view structural diagram of a display panel according to an embodiment of the present disclosure. FIG. 2 is another schematic top view structural diagram of a display panel according to an embodiment of the present disclosure. FIG. 3 is an enlarged detailed diagram of a region W in FIG. 2. FIG. 4 is a schematic cross-sectional structural diagram taken along A-A' in FIG. 3. FIG. 5 is a detailed structural diagram of a display substrate shown in FIG. 4. FIG. 6 is a detailed structural diagram of a touch electrode according to an embodiment of the present disclosure. A display panel 100 comprises a functional region HA, a display region AA disposed close to the functional region HA, a transition region FA between the functional region HA and the display region AA, and a non-display region NA surrounding the display region AA. The functional region HA may be located in any region of the display panel 100, the transition region FA is configured to realize a smooth transition from the functional region HA to the display region AA, in order to reduce an impact of the functional region HA on the display region AA.

In the functional region HA, functional elements, such as an earpiece, a camera, and various sensors may be placed so as to realize functions such as imaging, light sensing, and fingerprint recognition, thereby increasing a screen proportion of the display panel 100. Taking the imaging function as an example, a through hole configured to place a camera may be defined in the functional region HA to implement an in-screen camera. Certainly, a through hole may also not be defined in the functional region HA, an under-screen camera technology may be adopted to realize the imaging function. In the present disclosure, taking the functional region HA defined with the through hole to achieve the imaging function as an example is used for illustration.

Specifically, the display panel 100 comprises a display substrate 10 and a touch layer disposed on the display substrate 10. The touch layer comprises a plurality of touch electrode groups arranged at intervals on a side of the display substrate 10 in a first direction X and corresponding to the display region AA, each of the touch electrode groups comprises at least one touch electrode 20 arranged in a second direction Y, and the functional region HA and the transition region FA are located between two adjacent touch electrodes 20. The first direction X is a horizontal direction, the second direction Y is a vertical direction, and the first direction X and the second direction Y have an included angle of 90 degrees. Certainly, the present disclosure is not limited thereto, and the first direction X and the second direction Y of the present disclosure may have included angles of other degrees.

Optionally, in the touch layer, the touch electrodes 20 may be directly prepared on the display substrate 10 using a direct oncell touch (DOT, in which a touch function is directly prepared on a display unit) touch scheme, so that the display panel 100 has better integration, transmittance, bending resistance, and a thickness of a screen can be effectively reduced, and product cost can be reduced.

Specifically, the display substrate 10 comprises a substrate 11, a driving circuit layer 12, a light-emitting functional layer 13, and an encapsulation layer 14 sequentially stacked on the substrate 11, and the touch electrodes 20 are directly prepared on the encapsulation layer 14.

Optionally, the substrate 11 may be a rigid substrate or a flexible substrate. When the substrate 11 is a rigid substrate, a hard substrate such as a glass substrate may be included. When the substrate 11 is a flexible substrate, a flexible substrate comprising polyimide (PI) films or ultra-thin glass films may be included. A flexible display panel may be manufactured by using the flexible substrate as the substrate 11 to achieve special performance such as bending and rolling of the display panel 100.

Optionally, a buffer layer 15 may be disposed between the substrate 11 and the driving circuit layer 12. Materials of the buffer layer 15 may include inorganic materials such as silicon oxide ($SiO_x$), silicon nitride ($SiN_x$), silicon oxynitride (SiON), and the like. The buffer layer 15 may further prevent undesirable impurities or contaminants (such as moisture, oxygen, and the like) from diffusing from the substrate 11 into devices that may be damaged due to these impurities or contaminants, and may also provide a flat top surface.

The driving circuit layer 12 comprises an active layer 121, a gate insulating layer 122, a gate 123, an interlayer insulating layer 124, a source-drain layer 125, a planarization layer 126, a pixel electrode 127, and a pixel definition layer 128 sequentially disposed on the buffer layer 15. The active layer 121 comprises a channel region 1211, and a source region 1212 and a drain region 1213 located at two sides of the channel region 1211. The gate insulating layer 122 covers the active layer 121 and the buffer layer 15, and the gate 123 is disposed on the gate insulating layer 122 and disposed corresponding to the channel region 1211.

The interlayer insulating layer 124 covers the gate 123 and the gate insulating layer 122, the source-drain layer 125 is disposed on the interlayer insulating layer 124, and the source-drain layer 125 is patterned to form a source 1251, a drain 1252, a data line 1253, and the like. The source 1251 is connected to the source region 1212 through a via of the interlayer insulating layer 124, and the drain 1252 is connected to the drain region 1213 through another via of the interlayer insulating layer 124.

The planarization layer 126 covers the source-drain layer 125 and the interlayer insulating layer 124, and the planarization layer 126 may provide a flat film layer surface for the display panel 100 to improve stability in preparing the light-emitting functional layer 13. The pixel electrode 127 is disposed on the planarization layer 126, and is connected to the source 1251 or the drain 1252 through a via of the planarization layer 126. In the present disclosure, taking the pixel electrode 127 being connected to the drain 1252 is used as an example for illustration.

The pixel definition layer 128 covers the pixel electrode 127 and the planarization layer 126, and the pixel definition layer 128 is patterned with a pixel opening that exposes a portion of the pixel electrode 127 to define a light-emitting region.

It should be noted that a structure of the driving circuit layer 12 of the present disclosure is not limited to that of this embodiment. The driving circuit layer 12 of the present disclosure may further include more or less film layers, and positional relationship of film layers is not limited to that of this embodiment. For example, the gate 123 may be located below the active layer 121 to form a bottom gate structure. The driving circuit layer 12 serves to supply a driving voltage to the light-emitting functional layer 13 so that the light-emitting functional layer 13 emits light.

The light-emitting functional layer 13 comprises a light-emitting unit 131 and a cathode 132. The light-emitting unit 131 is formed by disposing light-emitting materials of different colors on a surface of the driving circuit layer 12. The light-emitting materials of different colors emit light of different colors, such as a red light-emitting material emits red light, a green light-emitting material emits green light, and a blue light-emitting material emits blue light.

The cathode 132 covers the light-emitting unit 131. The light-emitting unit 131 emits light under joint actions of the pixel electrode 127 and the cathode 132. Light-emitting units 131 of different colors emits light of different colors, thereby realizing full color display of the display panel 100.

Optionally, the pixel electrode 127 may be a transparent electrode or a reflective electrode. If the pixel electrode 127 is a transparent electrode, the pixel electrode 127 may be formed of, for example, indium tin oxide (ITO), indium zinc oxide (IZO), zinc oxide (ZnO), or indium oxide ($In_2O_3$). If the pixel electrode 127 is a reflective electrode, the pixel electrode 127 may include, for example, reflective layers formed of Ag, Mg, Al, Pt, Pd, Au, Ni, Nd, Ir, Cr, or a combination thereof, and layers formed of ITO, IZO, ZnO, or $In_2O_3$. However, the pixel electrode 127 is not limited thereto, and the pixel electrode 127 may be formed of various materials, and may also be formed in a single-layer or multi-layer structure.

It should be noted that whether the pixel electrode 127 specifically adopts a transparent electrode or a reflective electrode depends on a light-emitting direction of the display panel 100. When the display panel 100 adopts top light emission, the pixel electrode 127 may be a transparent electrode or a reflective electrode. Certainly, a utilization rate of light emitted by the light-emitting unit 131 can be improved when the reflective electrode is adopted. When the display panel 100 adopts bottom light emission, the pixel electrode 127 adopts a transparent electrode to increase transmittance of light. In this embodiment, taking the display panel 100 adopting the top light emission is used as an example for illustration. In order to increase the transmittance of light, the cathode 132 needs to be formed of transparent conductive materials. For example, the cathode 132 may be formed of transparent conductive oxides (TCO) such as ITO, IZO, ZnO, or $In_2O_3$.

Optionally, the light-emitting functional layer 13 may further comprise a hole injection layer (HIL) and a hole transport layer (HTL) disposed between the light-emitting unit 131 and the pixel electrode 127; and an electron injection layer (EIL) and an electron transport layer (ETL) disposed between the light-emitting unit 131 and the cathode 132. The hole injection layer receives holes transmitted by the pixel electrode 127, the holes are transmitted to the light-emitting unit 131 via the hole transport layer, the electron injection layer receives electrons transmitted by the cathode 132, the electrons are transmitted to the light-emitting unit 131 via the electron transport layer, the holes and the electrons are combined at the light-emitting unit 131 to form excitons, and the excitons transition from an excited state to the ground state to release energy and emit light.

The encapsulation layer 14 covers the light-emitting functional layer 13, and serves to protect the light-emitting unit 131 of the light-emitting functional layer 13 from failure of the light-emitting unit 131 caused by intrusion of water and oxygen. Optionally, the encapsulation layer 14 may be a thin film encapsulation, for example, the encapsulation layer 14 may be a laminated structure formed by sequentially laminating three layers of thin films of a first inorganic encapsulation layer, an organic encapsulation layer, and a second inorganic encapsulation layer, or a laminated structure of more layers.

The touch electrodes 20 are directly prepared on the encapsulation layer 14, the touch electrodes 20 are arranged on the encapsulation layer 14 in an array. Each column of the touch electrodes 20 serves as a touch electrode group, a plurality of touch electrode groups are arranged at intervals along the first direction X, and each column of the touch electrode groups comprises at least one touch electrode 20 arranged along the second direction Y. Each of the touch electrodes 20 comprises a plurality of intersecting touch electrode wires 21. The plurality of intersecting touch electrode wires 21 make the touch electrode 20 have a mesh design, as shown in FIG. 6. Meshes 22 refer to opening regions formed by the touch electrode wires 21, and the meshes 22 are disposed corresponding to the light-emitting units 131 of the display substrate 10 so as to prevent the touch electrodes 20 from affecting light extraction of the light-emitting units 131.

Below, a touch function structure of the display panel 100 will be specifically described by taking the display panel 100 comprising five columns of touch electrode groups, and each column of the touch electrode groups comprising three touch electrodes 20 as an example.

Five columns of touch electrode groups are arranged at intervals in the first direction X, and the three touch electrodes 20 of each column of the touch electrode groups are arranged at intervals in the second direction Y. The display panel 100 further comprises a plurality of first signal transmission lines 30 each electrically connected to one of the touch electrodes 20, and the first signal transmission lines 30 are disposed in a same layer with the touch electrodes 20. It should be noted that "disposed in a same layer" in the present disclosure means that two or more different features are obtained by patterning a film layer formed of a same material in a preparation process, and the two or more different features are disposed in a same layer. For example, if the touch electrodes 20 and the first signal transmission lines 30 of this embodiment are obtained by patterning a same conductive film layer, the touch electrodes 20 and the first signal transmission lines 30 are disposed in a same layer.

The first signal transmission lines 30 of a same column of the touch electrode groups are led out from corresponding touch electrodes 20 in the first direction X and extend in the second direction Y in a gap between the touch electrode group and an adjacent touch electrode group. It should be understood that the first signal transmission lines 30 may also be led out from the touch electrodes 20 in a direction opposite to the first direction X and extend in the second direction Y. The first signal transmission lines 30 corresponding to the touch electrodes 20 are disposed close to the non-display region NA for a column of touch electrode groups close to the non-display region NA.

The non-display region NA comprises a plurality of frame regions, such as an upper frame region 1, a lower frame region 2, a left frame region 3, and a right frame region 4, as schematically shown in FIG. 2. A bonding region BA is defined in the lower frame region 2, and the bonding region BA is located on a side of the display region AA. Certainly, a bending region BE is further defined in the lower frame region 2, and the bending region BE is located between the display region AA and the bonding region BA. By defining the bending region BE, the lower frame region 2 can be bent to a side of the display substrate 10 away from the touch electrodes 20 to achieve a narrow frame region or a borderless region. The bonding region BA is bonded with a driving chip 40 comprising a touch driving chip 41 and a display driving chip 42, the touch driving chip 41 is connected to the first signal transmission lines 30 and the like for providing touch driving signals, and the display driving chip 42 is connected to the data lines 1253 and the like for providing display driving signals. Certainly, the driving chip 40 of the present disclosure may also be a touch display driving integrated (TDDI) chip, which means that the touch driving chip 41 and the display driving chip 42 are integrated into one chip, and the two share one chip, so that cost of chips can be reduced.

It should be noted that when a type of the driving chip 40 is not specifically indicated in the present disclosure, the driving chip 40 of the present disclosure is defined as the touch driving chip 41. The driving chip 40 is electrically connected to the first signal transmission lines 30 for transmitting driving signals to the first signal transmission lines 30. The driving chip 40 supplies driving voltages to corresponding touch electrodes 20 through the first signal transmission lines 30, and then the first signal transmission lines 30 transmit inductive signals of the touch electrodes 20 back to the driving chip 40. If the touch electrodes 20 are touched by a finger, a stylus, or the like, the inductive signals change during this period, thereby determining a touch position.

When the driving chip 40 supplies driving signals to the touch electrodes 20, a line scan mode or a column scan mode may be generally used to supply a same driving signal to the touch electrodes 20 of a same column or row, and supply different driving signals such as ground, voltage signals of different frequencies, and the like, to the touch electrodes 20 of other columns or rows. In the present disclosure, the column scan is adopted as an example. The touch electrodes 20 in different columns have different driving signals. In this way, the first signal transmission lines 30 of a single functional group in a same column and the touch electrodes 20 in adjacent columns have different driving signals.

In order to prevent interference to the first signal transmission lines caused by different driving signals of two adjacent columns of the touch electrode groups, the display panel 100 of the present disclosure further comprises first signal shielding lines 50, the first signal shielding lines 50 are disposed corresponding to a gap between two adjacent touch electrode groups, and is located between the first signal transmission lines 30 of a same touch electrode group and the touch electrodes 20 of an adjacent touch electrode group. The first signal shielding lines 50 are disposed in a same layer with the first signal transmission lines 30, and the first signal shielding lines 50 are also electrically connected to the driving chip 40, which supply driving signals to the first signal shielding lines 50.

Optionally, the driving signals on the first signal shielding lines 50 are same with the driving signals on corresponding first signal transmission lines 30, so that there is no potential difference between the first signal shielding lines 50 and the corresponding first signal transmission lines 30, no interference is caused to the first signal transmission lines 30, and interference of the touch electrodes 20 in adjacent columns to the first signal transmission lines 30 can also be shielded, thereby improving touch performance of the display panel 100. Certainly, the driving signals on the first signal shielding lines 50 of the present disclosure may also be different from the driving signals on the corresponding first signal transmission lines 30, for example, the driving signals on the first signal shielding lines 50 are constant voltage signals, and interference of the constant voltage signals on the first signal shielding lines 50 to the first signal transmission lines 30 is removed by a chip algorithm of the driving chip 40.

The first signal shielding lines 50 extend from the display region AA to the upper frame region 1, wherein the first signal shielding lines 50 close to the left frame region 3 are connected together in the upper frame region 1 and extend into the left frame region 3, and extend from the left frame region 3 to the lower frame region 2 and are electrically connected to a driving chip 40 on a left side. The first signal shielding lines 50 close to the right frame region 4 are connected together in the upper frame region 1 and extend into the right frame region 4, and extend from the right frame region 4 to the lower frame region 2 and are electrically connected to a driving chip 40 on a right side. Specifically, the first signal shielding lines 50 may be divided into two groups. A first group of the first signal shielding lines 50 is led out from the driving chip 40 close to the left frame region 3, sequentially passes through the lower frame region 2, the left frame region 3, and the upper frame region 1 of the non-display region NA, enters the display region AA, and extends in the display region AA toward the second direction Y. A second group of the first signal shielding lines 50 are led out from the driving chip 40 close to the right frame region 4, and sequentially passes through the lower frame region 2, the right frame region 4, and the upper frame region 1 of the non-display region NA, enters the display region AA, and extend in a gap between adjacent touch electrode groups of the display region AA towards the second direction Y. Certainly, the first signal shielding lines 50 of the present disclosure may also be defined as a group, the group of the first signal shielding lines 50 led out from the left frame region 3 or the right frame region 4 of the non-display region NA and extends throughout the display region AA.

In addition, since the functional region HA and the transition region FA are located between two adjacent touch electrode groups, more specifically, located between two adjacent touch electrodes 20, and in the two touch electrode groups, sizes of the touch electrodes 20 close to the transition region FA is less than that of sizes of other touch electrodes 20, that is, the functional region HA and the transition region FA occupy a portion of a region in which the touch electrodes 20 are disposed, so that the first signal shielding line 50 located between the two adjacent touch electrode groups needs to pass through the transition region FA or the functional region HA. The size of the touch electrode 20 refers to a surface region of the touch electrode 20 in a top view. As shown in FIG. 2, the touch electrode 20 is indicated by a square, and then the size of the touch electrode 20 is an area of the square.

In order to prevent influence of the first signal shielding line 50 on lighting of the functional region HA, the first signal shielding line 50 is disposed in the transition region FA, and a profile of the first signal shielding line 50 in the transition region FA matches a profile of the functional region HA. For example, the functional region HA of this embodiment is defined with a circular through hole, so that the profile of the functional region HA is circular, so that the profile of the first signal shielding line 50 located in the transition region FA can be defined as an arc shape to match the circular through hole of the functional region HA. Certainly, the present disclosure is not limited here, and the through hole of the functional region HA described here may be other shapes, such as a square.

Wherein, the functional region HA and the transition region FA occupy a portion of the region where the touch electrodes 20 are disposed, so that the touch electrodes 20 close to the transition region FA are incomplete. In order not to affect the touch performance of the touch electrodes 20, compensation electrodes (not shown) may be disposed in the transition region FA to compensate the touch electrodes 20, and the compensation electrodes are electrically connected to corresponding touch electrodes 20.

It may be understood that when the functional region HA is defined with the through hole, film layers of the display substrate 10 and a touch functional layer (film layers on which touch function elements are located, such as the touch electrodes 20, etc.) corresponding to the functional region HA may be removed by laser cutting. However, cracks may be generated in cutting positions when removing these film layers by the laser cutting, a crack detection circuit 70 is further disposed in the display panel 100 of the present disclosure in order to detect whether cracks are generated during the laser cutting. In the transition region FA, the crack detection circuit 70 surrounds the functional region HA, and is located on a side of the first signal shielding line 50 close to the functional region HA.

The crack detection circuit 70 comprises a first crack detection line 71 and a second crack detection line 72, and the first crack detection line 71 and the second crack detection line 72 are electrically connected or integrally disposed in the transition region FA such that the first crack detection line 71 and the second crack detection line 72 surround the closed-loop crack detection circuit 70. The first crack detection line 71 extends from the transition region FA to the upper frame region 1, from the upper frame region 1 to the left frame region 3, from the left frame region 3 to the lower frame region 2, and is electrically connected to the driving chip 40 on the left side. In addition, in the non-display region NA, the first crack detection line 71 is located on a side of the first signal shielding lines 50 away from the display region AA. The second crack detection line 72 extends from the transition region FA to the upper frame region 1, from the upper frame region 1 to the right frame region 4, from the right frame region 4 to the lower frame region 2, and is electrically connected to the right driving chip 40. In addition, in the non-display region NA, the second crack detection line 72 is also located on a side of the first signal shielding lines 50 away from the display region AA.

In addition, the display panel 100 of the present disclosure further comprises at least one signal monitoring line 60 disposed corresponding to a gap between two adjacent touch electrode groups. The signal monitoring line 60 is also disposed in a same layer with the first signal transmission lines 30, and the signal monitoring line 60 is electrically connected to the driving chip 40. The driving chip 40 supplies the signal monitoring line 60 with monitoring signals, so that the signal monitoring line 60 can detect interference from display signals (such as data lines 1253) in a vertical direction in real time. Then, the driving chip 40 removes the interference by a chip algorithm according to the interference signal detected by the signal monitoring line 60, thereby further improving the touch performance of the display panel 100.

The signal monitoring line 60 also extends from the display region AA to the upper frame region 1, from the upper frame region 1 to the left frame region 3 or the right frame region 4, from the left frame region 3 or the right frame region 4 to the lower frame region 2, and is connected to a corresponding driving chip 40. And within the non-display region NA, the signal monitoring line 60 is located on a side of the first signal shielding lines 50 away from the display region AA and between the first signal shielding lines 50 and the first crack detection line 71 or the second crack detection line 72, such that the first crack detection line 71 or the second crack detection line 72 is located on a side of the signal monitoring line 60 away from the first signal shielding lines 50.

Specifically, the signal monitoring line 60 may be defined as two lines such that a first signal monitoring line 60 is led out of the driving chip 40 and enters the display region AA through the lower frame region 2, the left frame region 3, and the upper frame region 1 of the non-display region NA in sequence, and extends in the display region AA towards the second direction Y. A second signal monitoring line 60 is led out of the driving chip 40 and enters the display region AA through the lower frame region 2, the right frame region 4, and the upper frame region 1 of the non-display region NA, and extends in a gap between adjacent touch electrode groups of the display region AA along the second direction Y. It is understood that the more signal monitoring lines 60 are disposed, the more accurate the interference signal data obtained. In addition, in the non-display region NA, the signal monitoring lines 60 are located on the side of the first signal shielding lines 50 away from the display region AA, and in the display region AA, the signal monitoring lines 60 are disposed close to a middle region of the display region AA so as to prevent crossing of the signal monitoring lines 60 with the first signal shielding lines 50.

Optionally, the functional region HA is located in the middle region of the display panel 100, and the signal monitoring line 60 is also located in the middle region of the display panel 100, at this time, the signal monitoring line 60 also needs to pass through the functional region HA so that a portion of the signal monitoring line 60 is located in the transition region FA, and the signal monitoring line 60 is located between the first signal shielding line 50 and the crack detection circuit 70. A profile of the signal monitoring line 60 located in the transition region FA also matches the profile of the crack detection circuit 70 in order to maximize utilization of space of the transition region FA and prevent disposing a larger transition region FA to affect a screen proportion of the display panel.

It can be understood that the functional region HA of the present disclosure may also be located on two sides of the display panel 100, for example, close to the left or right frame region, and the signal monitoring line 60 is located in the middle region of the display panel 100, so that the signal monitoring line 60 does not need to pass through the functional region HA. At this time, there is no need to consider a wiring design of the signal monitoring line 60 in the transition region FA, which is beneficial to simplifying the wiring design.

Optionally, in order to improve visibility of the display panel 100, the display panel 100 further comprises floating (dummy) lines 80 located in the transition region FA, the floating lines 80 and the first signal shielding line 50 located on opposite sides of the crack detection circuit 70. A profile of the floating lines 80 also matches the crack detection circuit 70, and a number of the floating lines 80 is two, so that the first signal shielding line 50 and the signal monitoring line 60 on one side of the crack detection circuit 70 correspond to the floating lines 80 on another side of the crack detection circuit 70, so that metal wires in the transition region FA are uniformly distributed, so as to prevent reflection differences in local regions caused by metal wires being unevenly distributed, and prevent a difference in brightness and darkness when looking at the screen in an unlit state. The floating lines 80 adopt a disconnection design and do not have an electrical connection relationship with elements and wires in the display panel.

In addition, it should be noted that, in the present disclosure, the scheme of improving poor touch performance due to signal interference by disposing the first signal shielding lines 50 and the signal monitoring line 60 is not limited to the use in the DOT touch scheme, for example, it may also be used in an external touch scheme, in which the touch electrodes 20 are disposed on a touch panel, and then the touch panel is attached to the display substrate 10.

Figure 7:
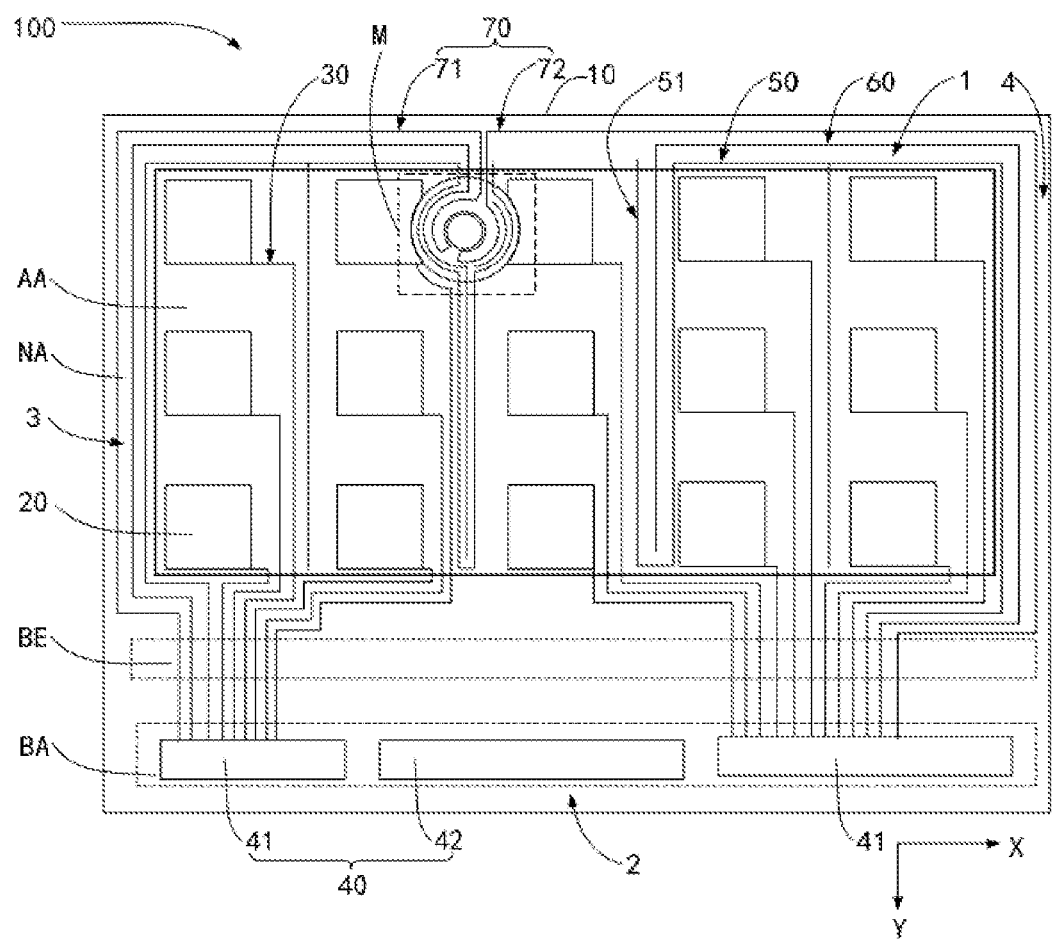
FIG. 7 is another schematic top view structural diagram of a display panel according to an embodiment of the present disclosure.
Figure 8:
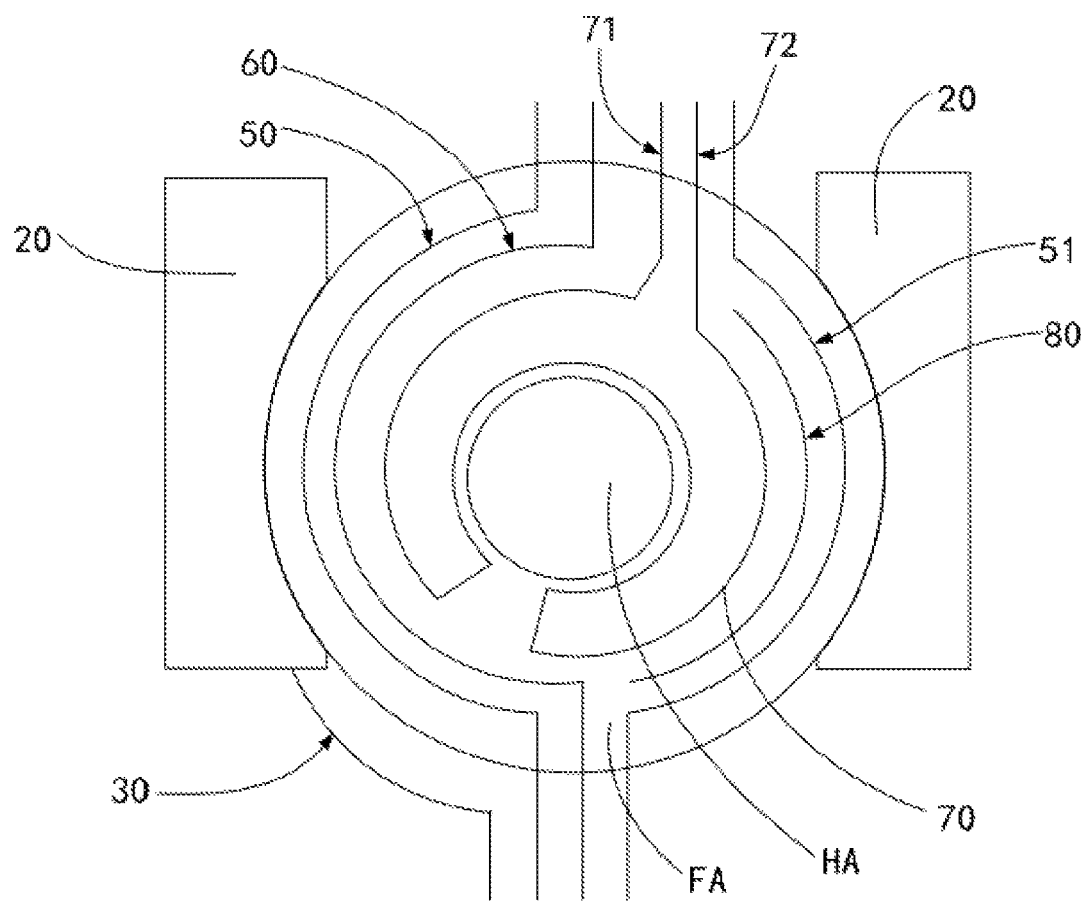
FIG. 8 is an enlarged detailed diagram of a region M in FIG. 7.

In one embodiment, referring to FIGS. 1 to 8, FIG. 7 is another schematic top view structural diagram of a display panel according to an embodiment of the present disclosure, and FIG. 8 is an enlarged detailed diagram of a region M in FIG. 7. In contrast to the above-described embodiment, the display panel 100 further comprises a second signal shielding line 51 located between two adjacent touch electrode groups and electrically connected to the first signal shielding lines 50, the second signal shielding line 51 and the first signal shielding lines 50 half surround the signal monitoring line 60 together, so that the second signal shielding line 51 is located between the signal monitoring line 60 and the touch electrodes 20 to prevent interference of the touch electrodes 20 by the signal monitoring line 60.

Optionally, a portion of the second signal shielding line 51 is also located in the transition region FA, and in the transition region FA, the first signal shielding line 50 and the second signal shielding line 51 are located on opposite sides of the crack detection circuit 70, and the second signal shielding line 51 is located on a side of the floating line 80 away from the crack detection circuit 70. A profile of the second signal shielding line 51 in the transition region FA also matches the profile of the crack detection circuit 70, and a number of the floating line 80 is one, so that the first signal shielding line 50 and the signal monitoring line 60 on one side of the crack detection circuit 70 correspond to the second signal shielding line 51 and the floating line 80 on another side of the crack detection circuit 70, respectively, so that the metal wires in the transition region FA are uniformly distributed. For other descriptions, refer to the above embodiment, and further details are not described here.

Figure 9:
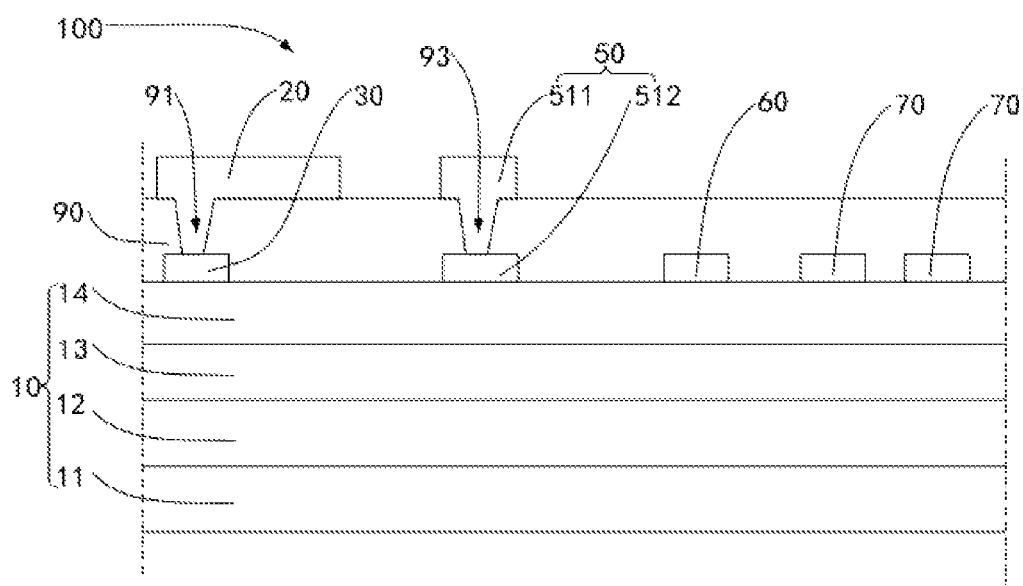
FIG. 9 is a schematic cross-sectional structural diagram of a display panel according to an embodiment of the present disclosure.

In one embodiment, referring to FIG. 9, FIG. 9 is a schematic cross-sectional structural diagram of a display panel according to an embodiment of the present disclosure. In contrast to the above-described embodiments, an insulating protective layer 90 is disposed between the touch electrodes 20 of the display panel 100 and the display substrate 10, and each of the first signal transmission lines 30 is electrically connected to a corresponding touch electrode 20 through a first via 91 of the insulating protective layer 90.

Optionally, a material of the insulating protective layer 90 includes inorganic materials such as silicon oxide or silicon nitride, and the insulating protective layer 90 is capable of protecting the first signal transmission lines 30 from a short circuit between adjacent first signal transmission lines 30. Each first signal transmission line 30 is electrically connected to the corresponding touch electrode 20 through the first via 91. A number of the first vias 91 is at least one. Certainly, by defining a plurality of first vias 91 to connect the first signal transmission lines 30 to corresponding touch electrodes 20, stability of connection can be improved, and impedance can be reduced.

In addition, the first signal transmission lines 30 are disposed corresponding to the touch electrodes 20, and an orthographic projection of the first signal transmission lines 30 on the display substrate 10 falls within a range of an orthographic projection of the touch electrodes 20 on the display substrate 10. More specifically, the first signal transmission lines 30 are disposed corresponding to the touch electrode wires 21 of the touch electrodes 20 so as to avoid the meshes 22 of the touch electrodes 20 and prevent the first signal transmission lines 30 from affecting the light extraction of the light-emitting unit 131.

In addition, the signal monitoring line 60 is disposed in a same layer with the first signal transmission lines 30 and corresponds to a gap between two adjacent columns of the touch electrode groups such that an orthographic projection of the signal monitoring line 60 on the display substrate 10 and the orthographic projection of the touch electrodes 20 on the display substrate 10 do not overlap. In this way, the signal monitoring line 60 can be brought close to the display substrate 10 to better monitor interference of display signals from the display substrate 10 in real time, and the signal monitoring line 60 and the first signal transmission lines 30 can be kept at a certain distance to prevent interference of the signal monitoring line 60 on the first signal transmission lines 30. Certainly, the signal monitoring line 60 may be disposed in a same layer with the touch electrodes 20, and the interference of the display signals from the display substrate 10 can also be monitored in real time.

In addition, each of the first signal shielding lines 50 comprises a first sub-signal shielding line 511 and a second sub-signal shielding line 512 electrically connected to the first sub-signal shielding line 511 through a third via 93 of the insulating protective layer 90, the first sub-signal shielding line 511 is disposed in a same layer with the touch electrodes 20, and the second sub-signal shielding line 512 is disposed in a same layer with the first signal transmission lines 30. Optionally, in the display region AA, a length of the first sub-signal shielding line 511 has a same length as a length of the second sub-signal shielding line 512, and the first sub-signal shielding line 511 and the second sub-signal shielding line 512 are connected through the third via 93, and a number of the third via 93 is at least one. Thus, the first signal shielding lines 50 adopt a double-layer design of an upper layer and a lower layer to better shield signal interference on a left and right side, and the double-layer design is equivalent to increasing a thickness of the first signal shielding lines 50 to better block influence of potential difference. At the same time, the double-layer design can reduce wiring impedance, and reduce signal attenuation inside the first signal shielding lines 50 and ensure shielding effect.

In addition, both the crack detection circuit 70 and the floating line (not shown) may be disposed in a same layer with the first signal transmission lines 30 or the touch electrodes 20, as shown in FIG. 9, the crack detection circuit 70 is disposed in a same layer with the first signal transmission lines 30. For other descriptions, refer to the above embodiments, and details are not described here.

Figure 10:
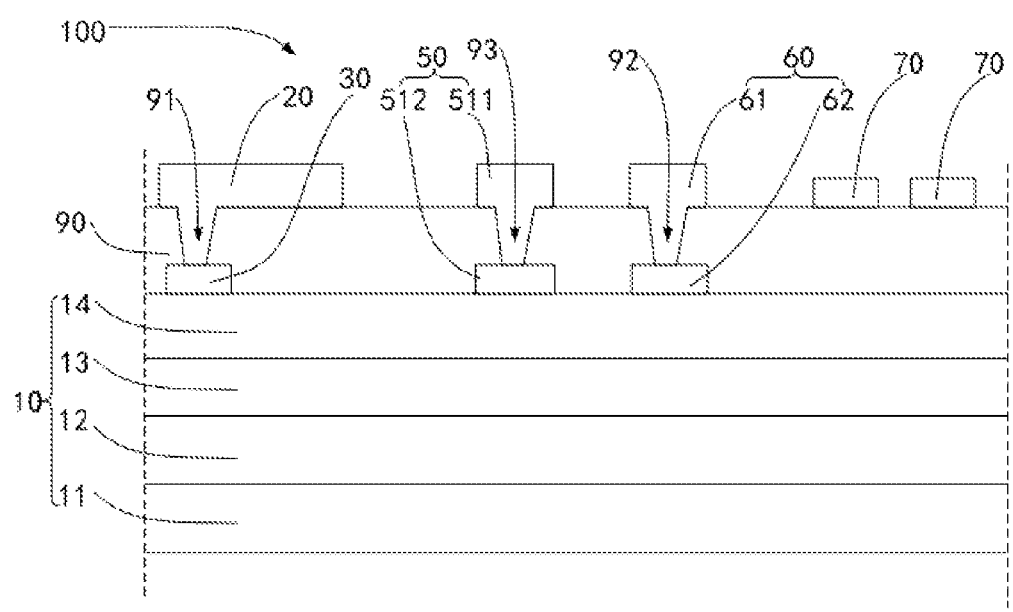
FIG. 10 is another schematic cross-sectional structural diagram of a display panel according to an embodiment of the present disclosure.

In one embodiment, referring to FIG. 10, FIG. 10 is another schematic cross-sectional structural diagram of a display panel according to an embodiment of the present disclosure. In contrast to the above-described embodiments, the signal monitoring line 60 of the display panel 100 also adopts a double-layer design. Specifically, the signal monitoring line 60 comprises a first sub-signal monitoring line 61 and a second sub-signal monitoring line 62 electrically connected to the first sub-signal monitoring line 61 through a second via 92 of the insulating protective layer 90. The first sub-signal monitoring line 61 is disposed in a same layer with the touch electrodes 20, and the second sub-signal monitoring line 62 is disposed in a same layer with the first signal transmission lines 30.

Optionally, the crack detection circuit 70 and the floating line (not shown) may be disposed in a same layer with the first signal transmission lines 30 or the touch electrodes 20. As shown in FIG. 10, the crack detection circuit 70 and the touch electrodes 20 are disposed in a same layer. Certainly, the present disclosure is not limited here, and the crack detection circuit 70 and the floating line of the present disclosure may be disposed in two layers. In addition, the floating line may be disposed in a same layer with the first signal transmission lines 30 or/and the touch electrodes 20. For other descriptions, refer to the above embodiment, and details are not described here.

In addition, it should be noted that in the present disclosure, a scheme for improving poor touch performance due to signal interference by disposing the first signal shielding lines 50 and the signal monitoring line 60 is not limited to a self-capacitive touch scheme used in the above-described embodiments, but may also be used in a single-layer mutual-capacitive touch scheme, which is not described here.

In one embodiment, an electronic device is provided, comprising a display panel of one of the above embodiments and a camera disposed corresponding to the functional region of the display panel, and the electronic device comprises electronic products such as a mobile phone, a tablet, a notebook, and the like.

According to the above-described embodiments, it can be seen that:

The present disclosure provides the display panel and the electronic device, the display panel comprises the functional region, the display region disposed close to the functional region, and the transition region between the functional region and the display region, the display panel further comprises the display substrate and the touch layer disposed on the display substrate, the touch layer comprises the plurality of touch electrode groups disposed on one side of the display region at intervals in the first direction, the plurality of touch electrode groups correspond to the display region, each of the touch electrode groups comprises at least one touch electrode disposed in the second direction, the functional region and the transition region are disposed between two adjacent touch electrodes, each of the touch electrodes is electrically connected to one first signal transmission line, each first signal shielding line is disposed between the first signal transmission lines of a same touch electrode group and the touch electrodes of an adjacent touch electrode group, the first signal shielding line is disposed corresponding to the gap between two adjacent touch electrode groups, and a part of the first signal shielding line is located in the transition region, the first signal shielding line is capable of shielding signal interference of the touch electrodes to the first signal transmission line. At a same time, at least one signal monitoring line is disposed corresponding to the gap between two adjacent touch electrode groups, a part of the signal monitoring line may also be located in the transition region, the signal monitoring line may monitor interference signals in real time, and a part of the interference signal is removed by a chip algorithm with respect to the interference signal, so as to improve the poor touch performance caused by the signal interference. Further, the closed-loop crack detection circuit is disposed in the transition region to detect whether cracks are generated when the functional region is dug, and the signal monitoring line is located between the crack detection circuit and the first signal shielding line, so that the problem of poor touch performance of the existing O-Cut screen can be solved while achieving a purpose of detecting cracks in the functional region.

In the above-described embodiments, the descriptions of various embodiments are each focused, and portions of some embodiments that are not detailed may be referred to related descriptions of other embodiments.

The above-described embodiments of the present disclosure are described in detail, and principles and embodiments of the present disclosure are described by using specific examples herein. The above-described embodiments are merely intended to help understand technical solutions and core ideas of the present disclosure. Those of ordinary skilled in the art will appreciate that they may still modify the technical solutions described in the foregoing embodiments, or equivalently replace some of the technical features therein, these modifications or substitutions do not cause the nature of the respective technical solutions to deviate from the scope of the technical solutions of the embodiments of the present disclosure.

What is claimed is:

1. A display panel, comprising a functional region, a display region disposed close to the functional region, and a transition region located between the functional region and the display region, wherein the display panel further comprises:
   a display substrate;
   a touch layer disposed on the display substrate, wherein the touch layer comprises a plurality of touch electrode groups arranged at intervals in the display region in a first direction, each of the touch electrode groups comprises at least one touch electrode arranged in a second direction;
   a plurality of first signal transmission lines, wherein each of the first signal transmission lines is electrically connected to one of the touch electrodes;
   first signal shielding lines disposed corresponding to a gap between two adjacent touch electrode groups and located between the first signal transmission lines of a same touch electrode group and the touch electrodes of an adjacent touch electrode group;
   wherein the functional region and the transition region are located between two adjacent touch electrode groups, and in the two touch electrode groups, a size of the touch electrodes close to the transition region is less than a size of other touch electrodes, the first signal shielding lines pass through the transition region, and in the transition region, a profile of the first signal shielding lines match a profile of a corresponding functional region.

2. The display panel according to claim 1, wherein the display panel further comprises a crack detection circuit, in the transition region, the crack detection circuit surrounds the functional region, and the crack detection circuit is located on a side of the first signal shielding line close to the functional region.

3. The display panel according to claim 2, wherein the crack detection circuit comprises a first crack detection line and a second crack detection line, in the transition area, the first crack detection line and the second crack detection line are electrically connected or integrally disposed in the transition region such that the first crack detection line and the second crack detection line are enclosed to form a closed-loop crack detection circuit.

4. The display panel according to claim 1, wherein the display panel further comprises at least one signal monitoring line disposed corresponding to a gap between two adjacent touch electrode groups.

5. The display panel according to claim 4, wherein the functional region is located in a middle region of the display panel and the signal monitoring line is located between the first signal shielding line and the functional region in the transition region.

6. The display panel according to claim 5, wherein the display panel further comprises a second signal shielding line, the second signal shielding line is located between two adjacent touch electrode groups, and electrically connected to the first signal shielding lines, and the second signal shielding line and the first signal shielding lines half surround the signal monitoring line.

7. The display panel according to claim 4, wherein the display panel further comprises a floating line located in the transition region, the floating line and the first signal shielding line are located on opposite sides of the functional region.

8. The display panel according to claim 7, wherein the display panel further comprises a second signal shielding line, the second signal shielding line is located between two adjacent touch electrode groups and electrically connected to the first signal shielding lines, the second signal shielding line and the first signal shielding lines half surround the signal monitoring line; and in the transition region, the first signal shielding line and the second signal shielding line are located on opposite sides of the functional region, and the second signal shielding line is located on a side of the floating line away from the functional region.

9. The display panel according to claim 1, wherein the display panel further comprises a non-display region surrounding the display region, the non-display region comprises an upper frame region and a lower frame region opposite to each other, a left frame region and a right frame region connecting the upper frame region and lower frame region, and the first signal shielding lines extend from the display region to the upper frame region, wherein the first signal shielding lines close to the left frame region are connected together in the upper frame region and extend into the left frame region; and the first signal shielding lines close to the right frame region are connected together in the upper frame region and extend into the right frame region.

10. The display panel according to claim 9, wherein the display panel further comprises at least one signal monitoring line disposed corresponding to a gap between two adjacent touch electrode groups; and the signal monitoring line also extends from the display region to the upper frame region and from the upper frame region to the left frame region or the right frame region, and in the non-display region, the signal monitoring line is located on a side of the first signal shielding lines away from the display region.

11. The display panel according to claim 10, wherein the display panel further comprises a crack detection circuit, in the transition region, the crack detection circuit surrounds the functional region and is located on a side of the first signal shielding line close to the functional region, and the crack detection circuit comprises a first crack detection line and a second crack detection line;

the first crack detection line extends from the transition region to the upper frame region and from the upper frame region to the left frame region, and in the non-display region, the first crack detection line is located on a side of the signal monitoring line away from the first signal shielding lines; the second crack detection line extends from the transition region to the upper frame region and from the upper frame region to the right frame region, and in the non-display region, the second crack detection line is located on a side of the signal monitoring line away from the first signal shielding lines.

12. The display panel according to claim 11, wherein the lower frame region is defined with a bonding region and the bonding region is bonded with driving chips; the first signal transmission lines, the first signal shielding lines, the signal monitoring line, the first crack detection line, and the second crack detection line are electrically connected to the driving chips; and the first signal shielding lines, the signal monitoring lines, the first crack detection line, and the second crack detection line extend from the left frame region or the right frame region to the lower frame region and are electrically connected to corresponding driving chips.

13. The display panel according to claim 1, wherein the display panel further comprises compensation electrodes disposed in the transition region and electrically connected to corresponding touch electrodes.

14. The display panel according to claim 1, wherein driving signals on the first signal shielding lines are same as driving signals on corresponding first signal transmission lines.

15. An electronic device, comprising the display panel of claim 1 and a camera disposed corresponding to a functional region of the display panel.

16. The electronic device according to claim 15, wherein the display panel further comprises a crack detection circuit, in the transition region, the crack detection circuit surrounds the functional region and is located on a side of the first signal shielding line close to the functional region.

17. The electronic device according to claim 15, wherein the display panel further comprises at least one signal monitoring line disposed corresponding to a gap between two adjacent touch electrode groups.

18. The electronic device according to claim 17, wherein the functional region is located in a middle region of the display panel, and in the transition region, the signal monitoring line is located between the first signal shielding line and the functional region.

19. The electronic device according to claim 17, wherein the display panel further comprises a floating line located in the transition region, the floating line and the first signal shielding line are located on opposite sides of the functional region.

20. The electronic device according to claim 19, wherein the display panel further comprises a second signal shielding line, the second signal shielding line is located between two adjacent touch electrode groups and electrically connected to the first signal shielding lines, the second signal shielding line and the first signal shielding lines half surround the signal monitoring line; and in the transition region, the first signal shielding line and the second signal shielding line are located on opposite sides of the functional region, and the second signal shielding line is located on a side of the floating line away from the functional region.

* * * * *